United States Patent
Kodama et al.

(10) Patent No.: US 6,527,569 B2
(45) Date of Patent: Mar. 4, 2003

(54) CARD CONNECTOR WITH LOW PROFILE EJECTOR MECHANISM

(75) Inventors: Takao Kodama, Machinda (JP); Takao Ito, Yokosuka (JP); Shinichi Maezono, Ebina (JP); Masahiro Mogi, Yokohama (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/911,665

(22) Filed: Jul. 24, 2001

(65) Prior Publication Data

US 2002/0048979 A1 Apr. 25, 2002

(30) Foreign Application Priority Data

Jul. 24, 2000 (JP) .......................... 2000-222314

(51) Int. Cl.[7] .............................................. H01R 13/62
(52) U.S. Cl. ..................................................... 439/159
(58) Field of Search ............................... 439/159, 152, 439/153, 154, 155, 156, 160

(56) References Cited

U.S. PATENT DOCUMENTS

| | | | |
|---|---|---|---|
| 5,383,789 A | 1/1995 | Watanabe | 439/159 |
| 5,421,737 A | 6/1995 | Chen et al. | 439/157 |
| 5,456,610 A | 10/1995 | Banakis et al. | 439/157 |
| 6,273,737 B1 * | 8/2001 | Furusho et al. | 439/159 |

* cited by examiner

*Primary Examiner*—Renee Luebke
*Assistant Examiner*—Phuongchi Nguyen
(74) *Attorney, Agent, or Firm*—Stacey E. Caldwell

(57) ABSTRACT

Disclosed is a low-profile card connector comprising a U-shaped housing; terminals mounted in the housing; and a card ejector comprising a rotary lever and an ejection rod for turning the rotary lever. The rotary lever comprises front and rear sections. The front section is contiguous with the rear section, and is in a plane lower and parallel to the rear section. The front section is rotatably fixed to the main body, and is covered by a cover member, which is assembled to the main body and the overlying front section of the rotary lever to be coplanar with the rear section of the rotary lever.

5 Claims, 9 Drawing Sheets

CARD CONNECTOR WITH LOW PROFILE EJECTOR MECHANISM

FIELD OF THE INVENTION

The present invention relates to a card connector for connecting a card such as a flash memory card to a printed circuit board, and specifically to such a card connector equipped with an ejector mechanism for ejecting the card from the card connector.

BACKGROUND OF THE INVENTION

Known card connectors typically comprise an insulating housing having a plurality of terminals laterally arranged and mounted therein and adapted to mate with corresponding contacts on a memory card, and a card ejector mechanism for ejecting the card from the housing. The card ejector mechanism is composed of a rotary lever pivotally fixed to the housing and an ejection rod operatively connected to the rotary lever for turning the rotary lever and ejecting the card.

The rotary lever is pivotably movable relative to the housing and is mounted between the housing and an overlying shell cover. The ejection rod is movably mounted on one side of the housing, such that it moves back and forth in directions opposite to the directions in which the card is ejected and inserted into the housing. One end of the ejection rod is operatively connected to one end of the rotary lever. The rotary lever has a tab provided on the other end, and the tab of the rotary lever engages the front end of the card after it is fully inserted into the housing. With this arrangement, insertion of the card into the card connector causes the rotary lever to turn in one direction, thus causing the ejection rod to move in the (rearward) direction opposite the(forward) direction in which the card is inserted. Conversely, when the ejection rod is pushed inward, i.e. in the forward direction, the rotary lever turns in the opposite direction, thus causing the tab to eject the card from the housing.

Such conventional card connectors structure have the rotary lever and the overlying shell cover mounted on the housing. However, the laminating stacked construction of these components, prevents reduction of the height of the connector body, and therefore cannot meet the ongoing requirement for height reduction and low-profiling of card connectors.

SUMMARY OF THE INVENTION

An object of the present invention is to provide a card connector structure whose profile can be reduced significantly.

To attain this object, the ejection mechanism according to the present invention includes a rotary lever that is composed of front and rear sections at different levels; wherein the lower front section is covered by the cover member and the higher rear section is exposed to be flush or coplanar with the cover member.

Specifically, the card connector comprises: a U-shaped insulating housing comprising a main body and two parallel longitudinal extensions connected to and extending from opposite ends of the main body and defining a card cavity therebetween; a plurality of terminals mounted in the main body for mating with corresponding contacts of a memory card; and a card ejector mechanism for ejecting a card from the card cavity comprising a rotary lever and an ejection rod for turning the rotary lever, wherein the rotary lever comprises front and rear sections, the front section being contiguous with the rear section and located in a plane parallel to and lower than the rear section, and wherein the front section is rotatably fixed to the main body and covered by a cover member, which is mounted to the main body and is coplanar with the rear section of the rotary lever.

With this arrangement, the total height of the card connector is reduced to the height of the insulating housing plus the thickness of the rotary lever of the card ejector.

The cover member comprises upper and lower plates and a rear plate integrally connected to the upper and lower plates to form a cover body having a U-shaped cross section, so that the upper and lower plates are mounted to the front section of the rotary lever and to the main body of the insulating housing, respectively, thus sandwiching the front section of the rotary lever and at least a selected part of the main body of the insulating housing.

With this arrangement, attachment of the rotary lever to the housing is facilitated.

The rotary lever further has an arc-shaped projection formed on a lateral edge of a front section thereof, thus allowing the arc-shaped projection to abut the rear plate of the cover member, acting as a pivot fulcrum for the rotary lever.

Since the rotary lever is made of thin sheet metal material, the rotary lever is positively supported with minimum friction.

The main body includes a stud provided thereon, and the rotary lever and upper plate have apertures formed therein to accommodate the stud.

With this arrangement, the attaching of the rotary lever to the housing is facilitated, and friction is minimized.

The card connector further comprises a traversing shell cover to cover at least a portion of the card cavity, wherein the shell cover is coplanar with the rear section of the rotary lever and with the cover member.

The traversing shell cover increases the mechanical strength of the parallel longitudinal extensions, and the card cavity is prevented from being deformed. Furthermore, the shell cover can be used in robotic assembly of the card, that is, when a vacuum head is applied to the shell cover, it can be transported to an associated printed circuit board for installing therein. This facilitates automatization in assembling lines.

Other objects and advantages of the present invention will be understood from the following description of a card connector according to a preferred embodiment of the present invention in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings in which like reference numerals identify like elements in the figures and in which:

DESCRIPTION OF THE PREFERRED EMBODIMENT

Figure 5:
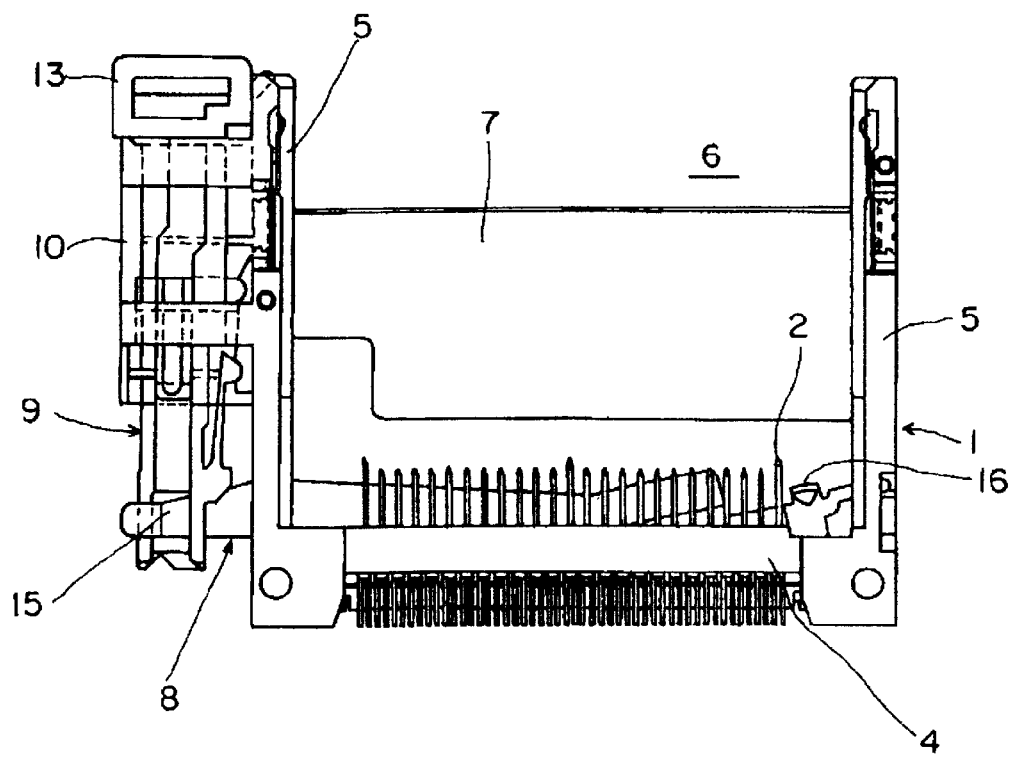
FIG. 5 is a bottom view of the card connector.
Figure 11:
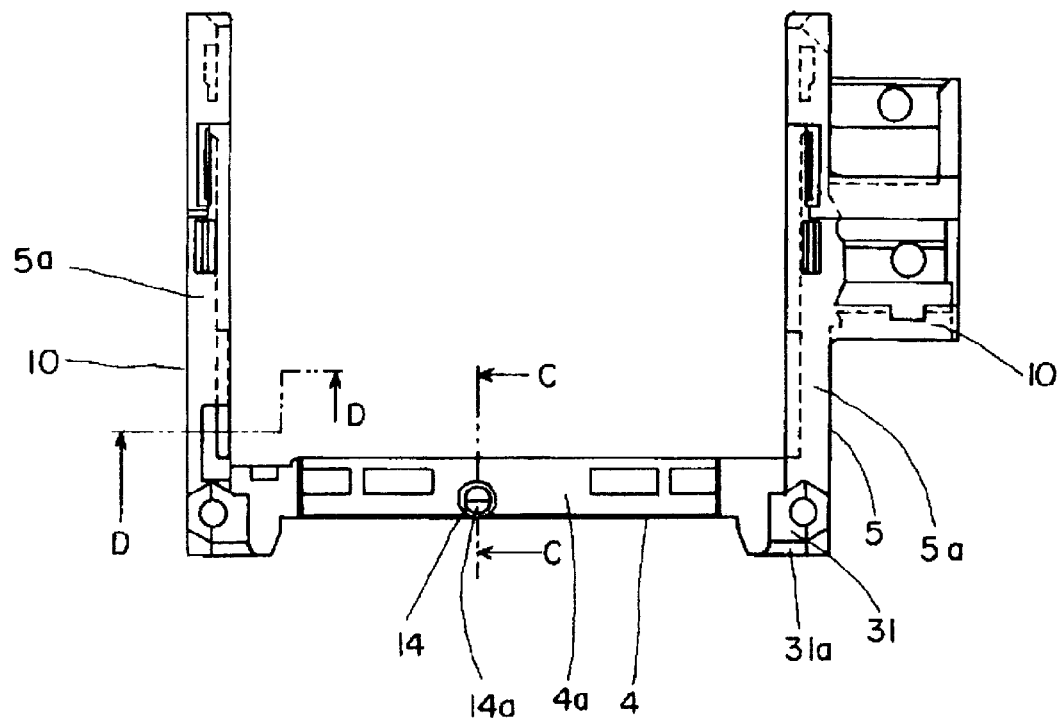
FIG. 11 is a plan view of the insulating housing of the card connector.

A card connector according to the present invention is described below. Referring first to FIGS. 1 through 5, a card connector comprises a U-shaped insulating housing 1, upper and lower lateral arrangements of terminals 2 mounted in the housing 1, and a card ejector 3 for ejecting a card from the card connector. Insulating housing 1 is made of plastic material and comprises an elongated main body 4 and two parallel longitudinal extensions 5 integrally connected to and extending from opposite ends of main body 4, as best seen in FIGS. 5 and 11. A card cavity 6 is defined by the area between longitudinal extensions 5.

Each terminal 2 is stamped and formed from sheet metal material and is mounted in main body 4 so that a pin contact 2a extends into card cavity 6 for mating to a corresponding female contact on the front side of an inserted card, and a dependent soldering tail 2b is flush with the bottom of insulating housing 1, to enable soldering of the solder tails to corresponding conductors of an underlying printed circuit board.

Figure 13:
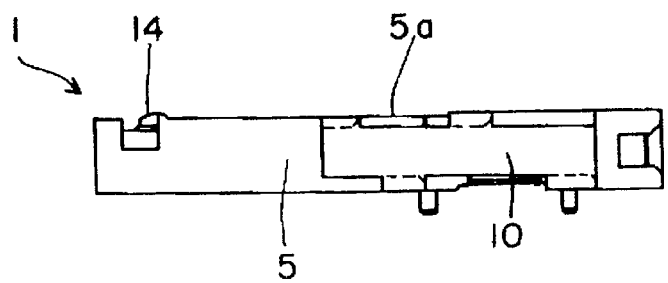
FIG. 13 is a right side view of the insulating housing.

A rectangular shell cover 7 extends between longitudinal extensions 5, thereby partially covering card cavity 6 and at the same time reinforcing longitudinal extensions 5. Shell cover 7 is stamped out of a relatively thin sheet metal material, and each longitudinal extension 5 is notched to a depth equal to the thickness of the cover on its inner side (see FIG. 13), thus allowing opposite ends of the shell cover 7 to fit in the notch of each longitudinal extension 5 such that the upper surface of shell cover 7 is flush with the upper surface of another cover member, as later described (see FIG. 7).

Card ejector mechanism 3 comprises a rotary lever 8 and an ejection rod 9 for turning rotary lever 8. Ejection rod 9 is fabricated of plastic material and is mounted in an associated support frame 10 formed on one of the longitudinal extensions 5. The ejection rod can move back and forth within support frame 10 along the one longitudinal extension 5. A knob 13 is formed on one end of ejection rod 9.

Rotary lever 8 is rotatably mounted on main body 4 of insulating housing 1 so that it turns about a round stud 14 formed on the middle of the main body. Rotary lever 8 has a joint 15 formed on one end thereof and a dependent tab 16 formed on the other end. Joint 15 of rotary lever 8 is connected to one end of ejection rod 9. When ejection rod 9 moves back and forth as indicated by arrows 12 and 11 in FIG. 1, rotary lever 8 turns accordingly.

Insertion of a card in card cavity 6 of insulating housing 1 puts the front of the card in engagement with dependent tab 16, thereby causing rotary lever 8 to turn counter clockwise to move ejection rod 9 rearwardly, thus causing knob 13 of ejection rod 9 to project outwardly. When ejection rod 9 is moved forward by pushing knob 13 (as indicated by arrow 11), rotary lever 8 turns clockwise and the card is pushed out of the card cavity. The positions of rotary lever 8 and ejection rod 9 after pushing know 13 are shown in solid lines in FIG. 1, whereas the positions of rotary lever 8 and ejection rod 9 after inserting a card in card cavity 6 are shown in broken lines in FIG. 1. The arrangement described so far is found in a conventional card connector structure. The feature of the present invention resides in the structure of rotary lever 8 as described below.

Figure 8:
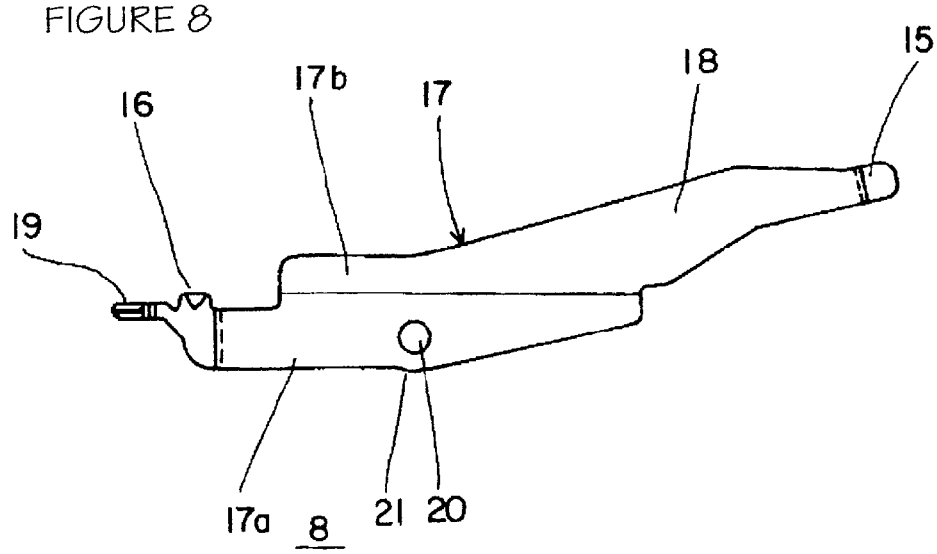
FIG. 8 is a plan view of the rotary lever of the card connector.
Figure 9:
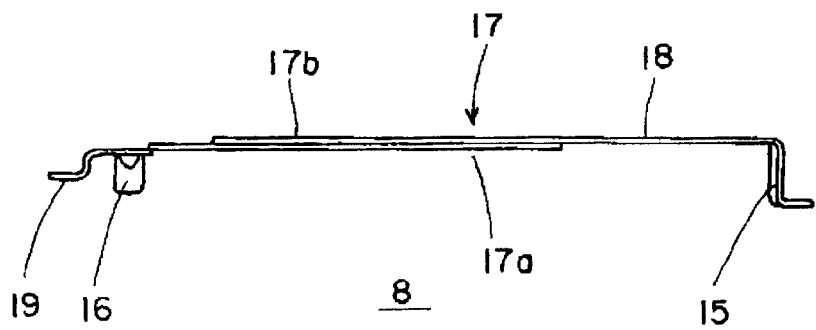
FIG. 9 is a front view of the rotary lever.
Figure 10:
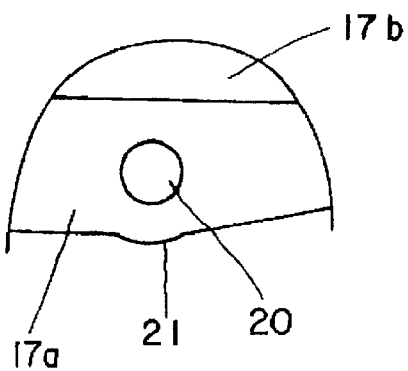
FIG. 10 is an enlarged view of Part B of FIG. 8.

Referring to FIGS. 8 to 10, rotary lever 8 is stamped out of thin sheet metal material and comprises front and rear sections 17a and 17b. Front section 17a is contiguous with rear section 17b, and is at a plane parallel to and lower than rear section 17b. Specifically, front section 17a is lowered a distance equal to the thickness of the thin metal sheet down from rear section 17b. Rear section 17b has an extension on which is formed a crank 15, which is to be connected to the joint of ejection rod 9.

Front section 17a includes a dependent tab 16 and a crank-like tab 19 both formed at one end. Also, front section 17a includes an aperture 20 formed in the middle, and the outer edge of front section 17a is bent obliquely inwardly in the vicinity of round aperture 20. Round aperture 20 is somewhat larger in diameter than round stud 14. Front section 17a has an arc-shaped projection 21 formed at its straight-to-oblique transition.

Figure 15:
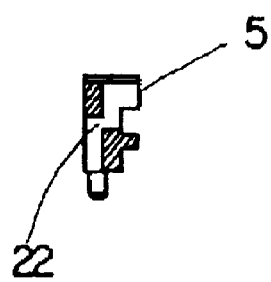
FIG. 15 is a sectional view of the insulating housing taken along the line D—D in FIG. 11.

Rotary lever 8 is rotatably fixed to main body 4 of insulating housing 1. Specifically, front section 17a is mounted on main body 4 with stud 14 loosely fitted in aperture 20. Crank end 15 of rear section 17b is connected to the joint of ejection rod 9, and crank-like tab 19 of front section 17a is inserted in a slot 22 formed in longitudinal extension 5 (see FIG. 15).

An arm-like extension 18 of rear section 17b is put on an upper surface of longitudinal extension 5, extending toward ejection rod 9, and the middle of rear section 17b is above main body 4. Main body 4 and longitudinal extensions 5 are formed as seen in FIGS. 11 through 15.

Specifically, each longitudinal extension 5 has a bearing surface 5a lowered a distance equal to the thickness of shell cover 7 from its exposed end, and main body 4 has a bearing surface 4a lowered a distance equal to the thickness of rotary lever 8 down from bearing surface 5a of longitudinal extension 5. Thus, front section 17a of rotary lever 8 is laid on bearing surface 4a of main body 4 and arm-like extension 18 of rear section 17b is laid on bearing surface 5a of longitudinal extension 5.

Figure 16:
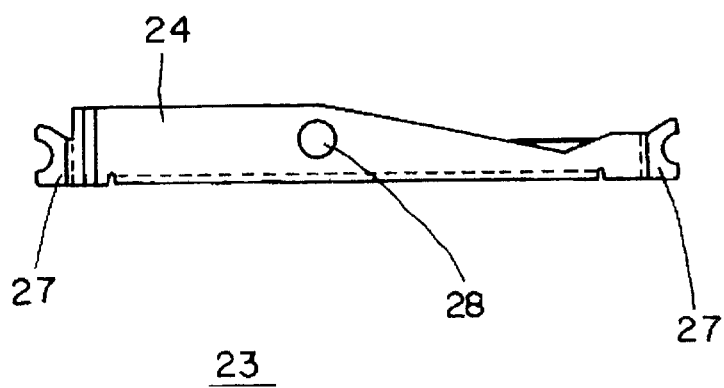
FIG. 16 is a plan view of the cover member of the card connector.
Figure 17:
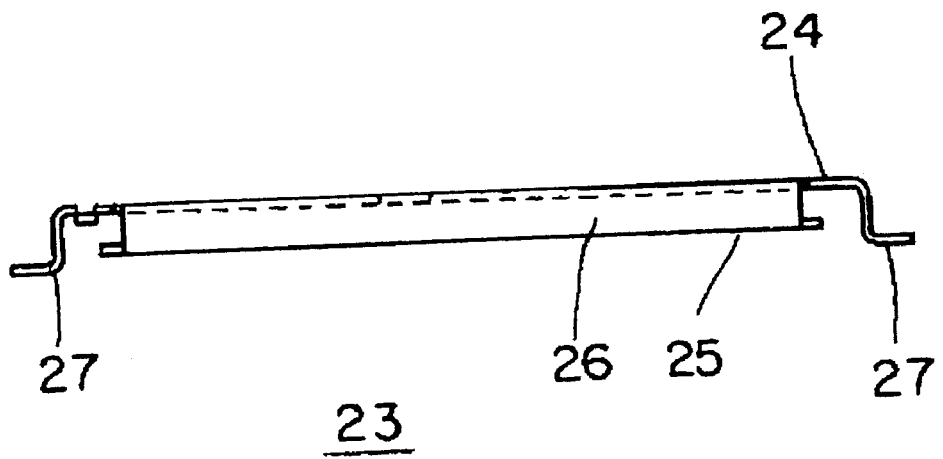
FIG. 17 is a front view of the cover member.
Figure 18:
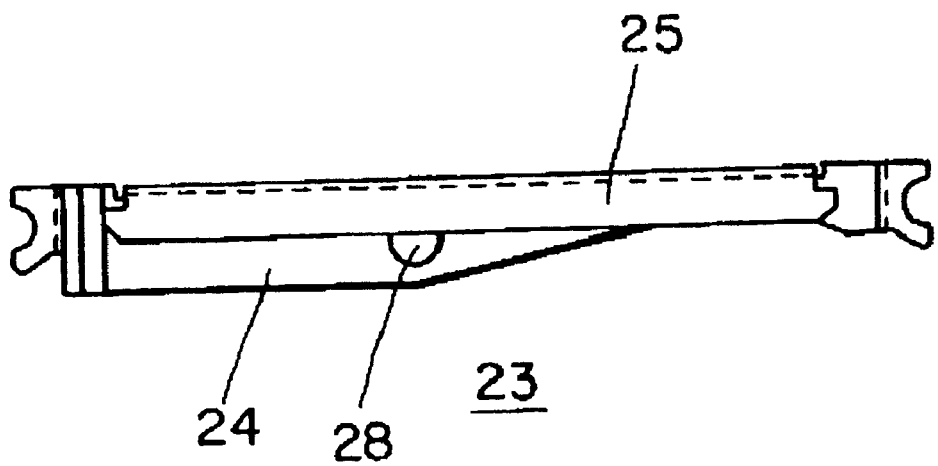
FIG. 18 is a bottom view of the cover member.

Rotary lever 8 is covered by a cover member 23, which is assembled to main body 4 and overlies front section 17a to be coplanar with rear section 17b of rotary lever 8. Referring to FIGS. 16 to 18, cover member 23 is stamped out of relatively thin sheet metal material, and comprises upper and lower plates 24 and 25 and a rear plate 26 integrally connected to upper and lower plates 24 and 25 to form a cover body having a U-shaped cross section. Upper plate 24 has L-shaped pieces 27 integrally connected to its opposite ends, and has a round aperture 28 formed generally in its center. The outer edge of upper plate 24 is formed obliquely inwardly.

Figure 14:
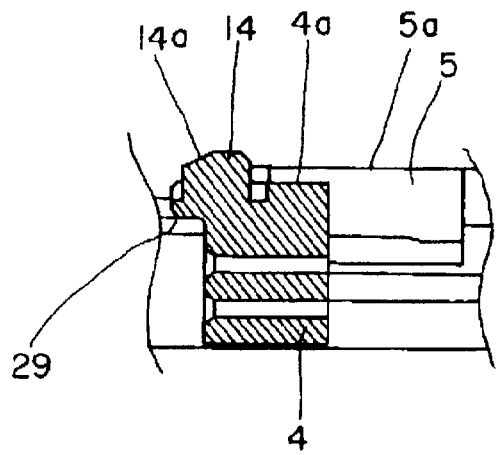
FIG. 14 is an enlarged sectional view of the insulating housing taken along the line C—C in FIG. 11.
Figure 19:
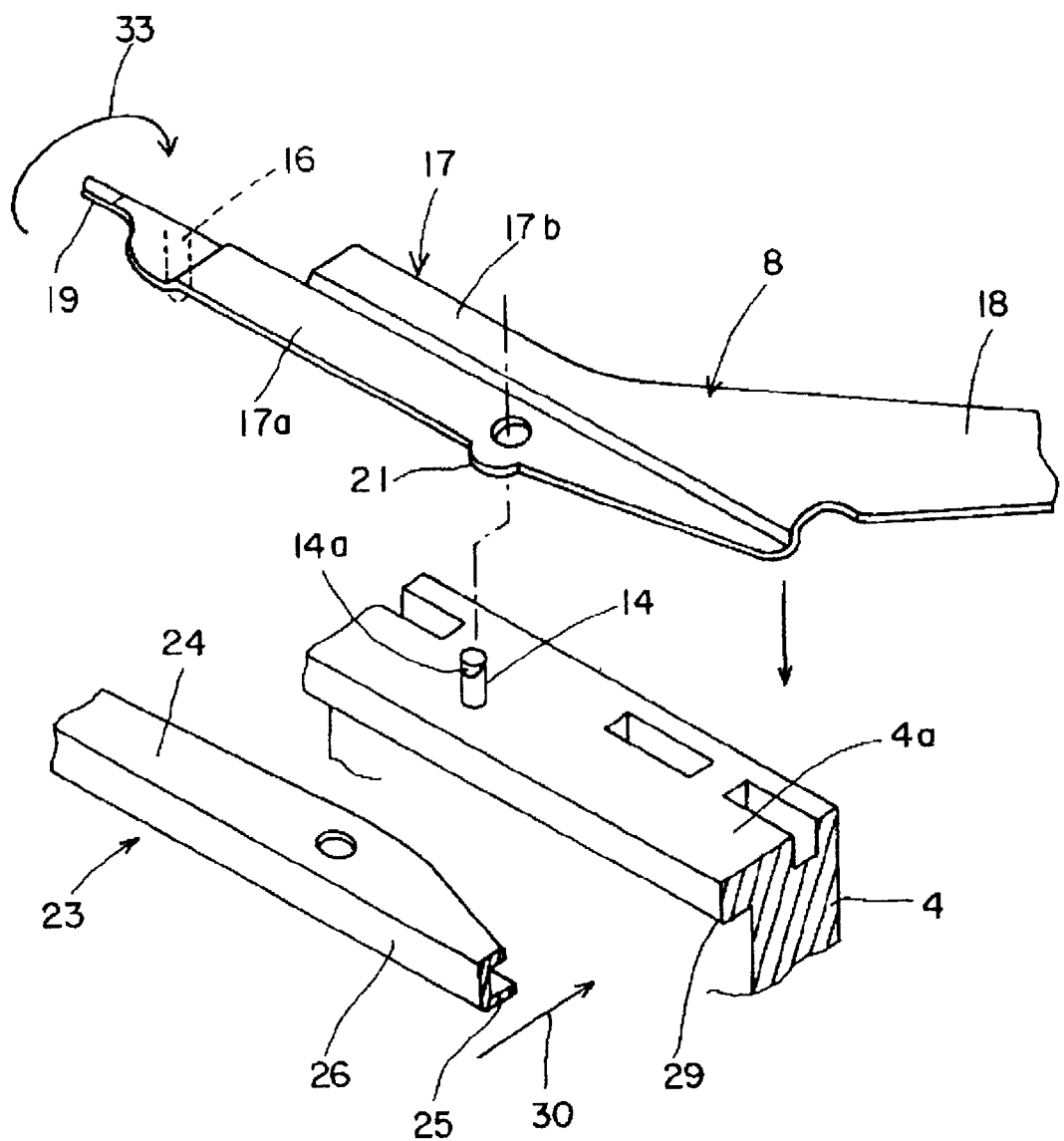
FIG. 19 is a perspective view illustrating how the rotary lever and the cover member can be attached to the insulating housing.

Referring to FIG. 14, main body 4 is notched to provide a lateral shoulder 29, allowing cover member 23 to be assembled to main body 4 for holding rotary lever 8. Referring to FIG. 19, rotary lever 8 is assembled to main body 4, and then cover member 23 is assembled to main body 4 and overlying rotary lever 8, as indicated by arrow 30.

Figure 1:
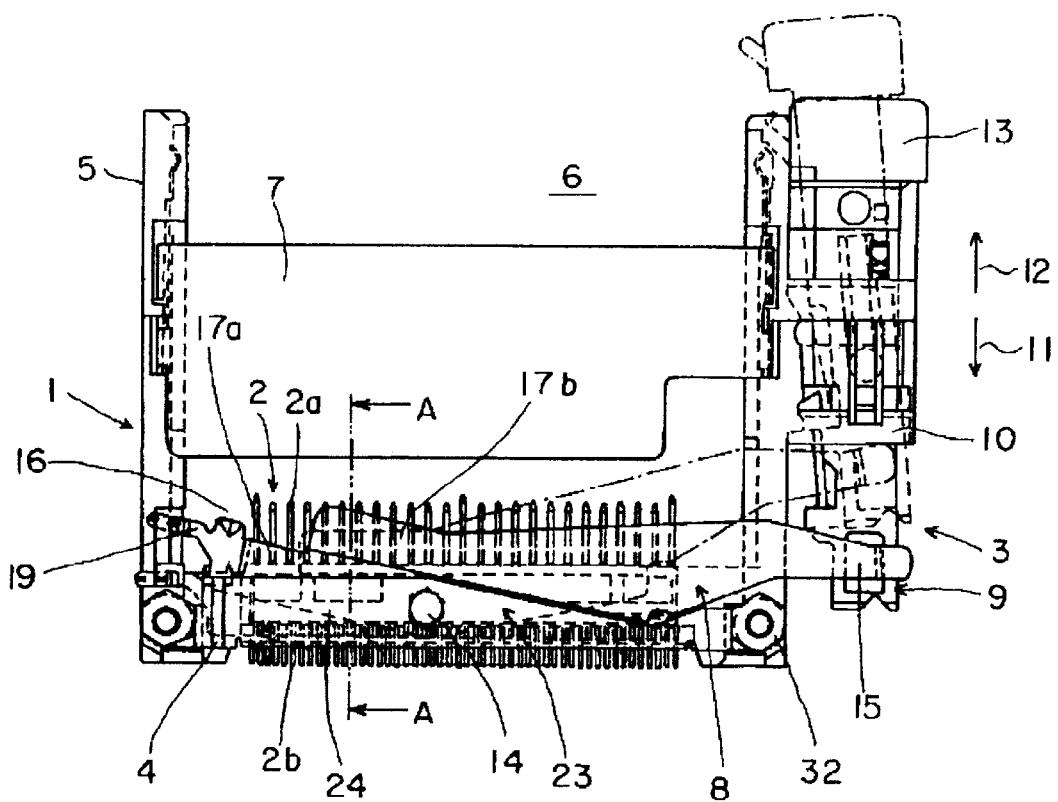
FIG. 1 is a plan view of a card connector according to the present invention.
Figure 2:
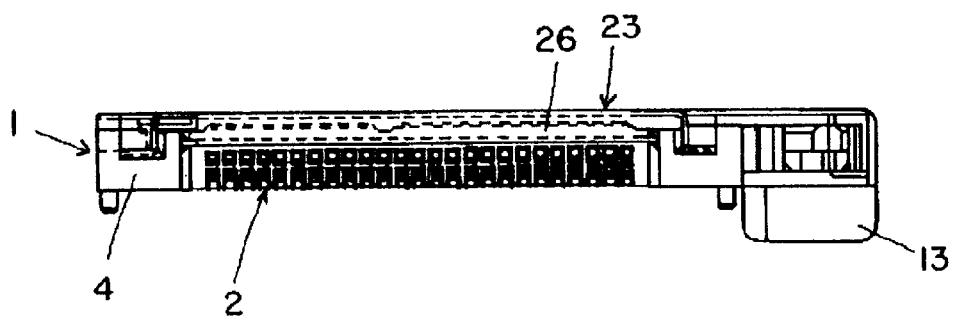
FIG. 2 is a front view of the card connector.
Figure 3:
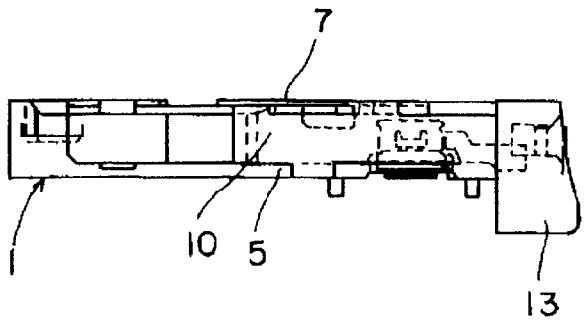
FIG. 3 is a right side view of the card connector.
Figure 4:
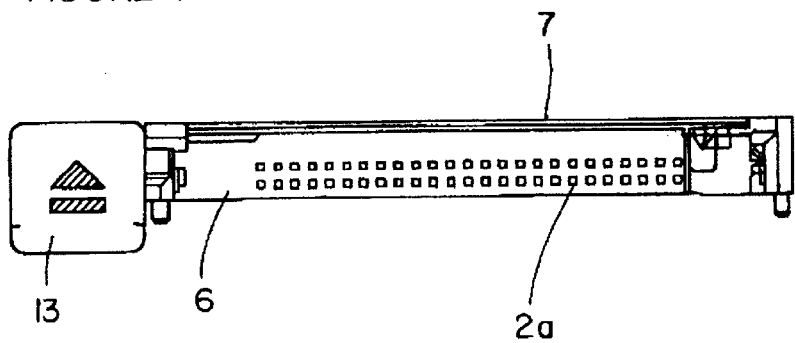
FIG. 4 is a rear view of the card connector.
Figure 6:
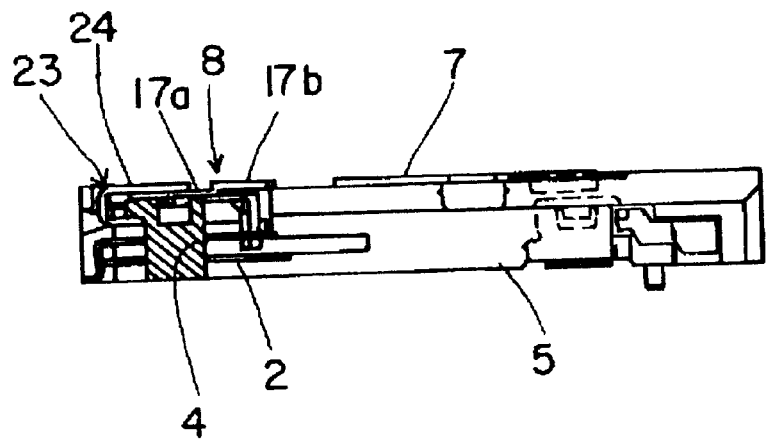
FIG. 6 is a sectional view of the card connector taken along the line A—A in FIG. 1.
Figure 7:
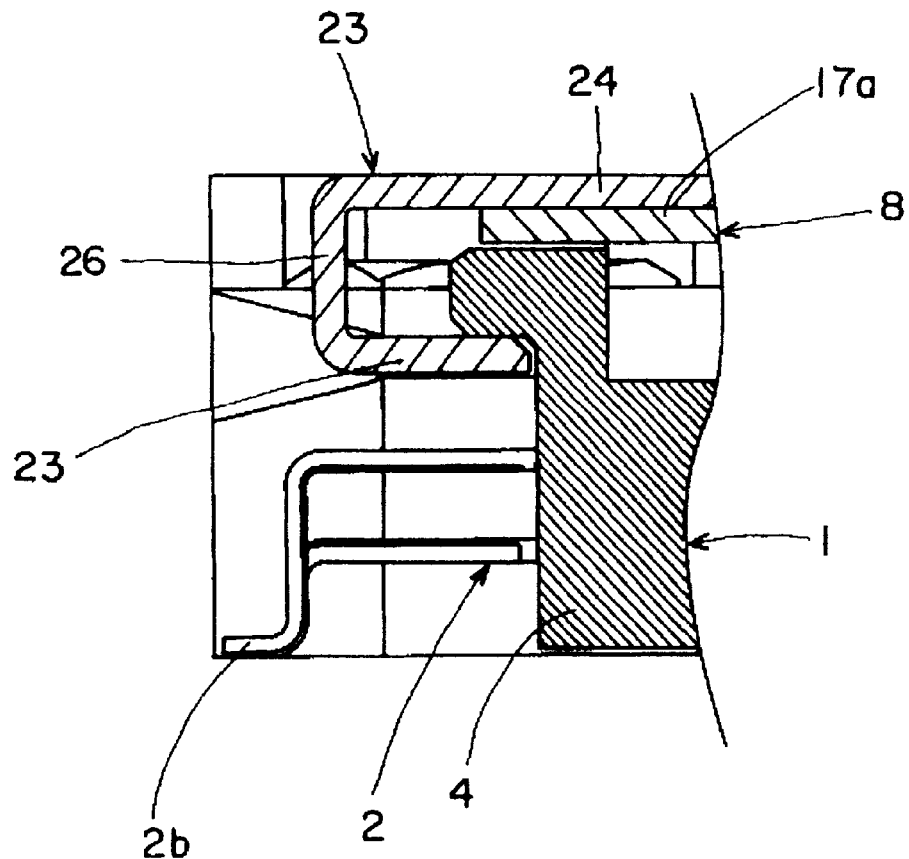
FIG. 7 is an enlarged view of a fragment of the card connector of FIG. 6.

As seen in FIGS. 1, 6 and 7, upper plate 24 of cover member 23 is laid on front section 17a of rotary lever 8 with the oblique edge of upper plate 24 confronting the stepwise front-to-rear transition of rotary lever 8. Arc-shaped projection 21 of front section 17a of rotary lever 8 abuts on rear plate 26 of cover member 23, allowing the inward oblique edge of front section 17a to confront the inner surface of rear plate 26.

Upper plate 24 of cover member 23 is laid on front section 17a of rotary lever 8 so that the upper surface of upper plate 24 is flush with the upper surface of rear section 17b of rotary lever 8. Thus, the overall height of the card connector is equal to the sum of the height of insulating housing 1 and the thickness of rotary lever 8, and is lower than the height of a conventional card connector having a rotary lever and an overlying shell cover.

Cover member 23 is fixed to main body 4 of housing 1 by inserting stud 14 loosely into aperture 28 of upper plate 24 and by engaging lower plate 25 with shoulder projection 29 of main body 4, so that front section 17a of rotary lever 8 and main body 4 of housing 1 may be sandwiched and positively held between the upper and lower plates 24 and 25 of cover member 23. Thus, prior to mounting the card connector to an underlying printed circuit board, rotary lever 8 can be fixedly supported to prevent the decoupling of rotary lever 8 from ejection rod 9.

Figure 12:
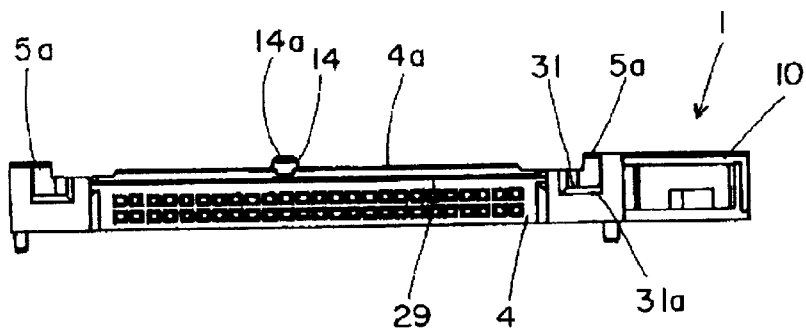
FIG. 12 is a front view of the insulating housing.

Stud 14 has a chamfered top 14a in confronting relation with cover member 23, which is assembled to main body 4 in the direction indicated by arrow 30. Main body 4 of housing 1 has recesses 31 on its opposite ends for accommodating hook pieces 27 of opposite ends of cover member 24. As seen in FIGS. 11 and 12, the seat defined by each recess 31 has chamfered vertical and horizontal edges, thereby facilitating the mounting of cover member 23 to housing 1. The aperture of upper plate 24 is somewhat larger than the diameter of stud 14, thereby facilitating the mounting of cover member 23 to housing 1.

A hexagonal nut 32 is put on each hook piece 27 of the cover member, which hook piece 27 is seated in recess 31. Each hexagonal nut 32 is thermally swaged on main body 4 so that it may be tentatively fixed thereto. When bolting the card connector to an associated printed circuit board, the card connector can be put on the printed circuit board with hexagonal nuts 32 aligned with bolts, which pass through associated apertures of the printed circuit board, and then the card connector can be fixed to thereto by driving and tightening the bolts in the nuts. Then cover member 23 can be positively fixed to the housing with its opposite hook ends 27 bolted to the housing and the underlying printed circuit board.

When a card is inserted in card cavity 6 of the card connector, and when the card is ejected from card cavity 6, rotary lever 8 is rotated about the stud pivot 14. Due to the abutment of arc-shaped projection 21 of front section 17a of rotary lever 8 on rear plate 26 of cover member 23, rotary lever 8 is supported by cover member 23 during the rotation. Furthermore, the loose fitting of stud 14 has the effect of preventing the stud from being worn.

When ejection rod 9 is pushed to eject the card from card cavity 6, a rotary moment is applied to rotary lever 8 as indicted by the arrow 33 in FIG. 19 due to the resistance caused by the friction between pin terminals 2 of the card connector and the corresponding female contacts of the card. Thus, front section 17a of rotary lever 8 would be twisted if cover member 23 did not suppress such twisting. Similarly, insertion of the card in the card cavity 6 would cause the twisting of the rotary lever if the cover member did not suppress such twisting. Thus, the smooth ejection and insertion of the card can be assured due to cover member 23.

Figure 20:
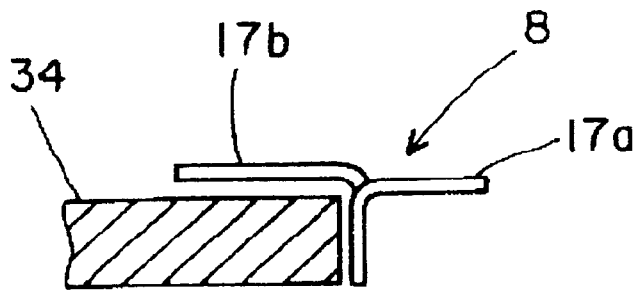
FIG. 20 illustrates at what level a relatively thin card is with respect to the middle of the rotary lever.
Figure 21:
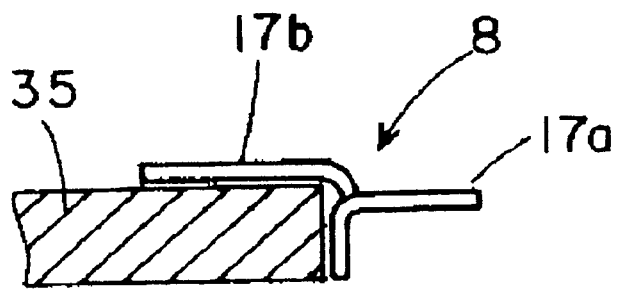
FIG. 21 is a similar view illustrating at what level a relatively thick card is with respect to the middle of the rotary lever.

The stepwise transition from the front to rear section of the rotary lever permits the profile of the whole card connector to be reduced in height, still assuring that the card cavity can accommodate a relatively thick card (see FIG. 21) as well as a relatively thin card (see FIG. 20).

It will be understood that the invention may6 be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A card connector for connecting a memory card to an underlying printed circuit board comprising:
    a U-shaped insulating housing having a main body and two parallel longitudinal extensions integrally connected to and extending from opposite ends of the main body and defining a card cavity therebetween;
    a plurality of terminals mounted in the main body adapted to mate with corresponding contacts of the memory card; and
    a card ejector for ejecting a card from the card cavity, the ejector including
        a rotary lever rotatably fixed to the main body and
        an ejection rod for turning the rotary lever and causing ejection of the card,
        wherein the rotary lever includes front and rear sections, the front section being contiguous with the rear section and being at a level lower than the rear section such that the overall height of the card connector is equal to the height of the housing and the thickness of the rotary lever,
        and wherein the a cover member comprises upper and lower plates and a rear plate integrally connecting the upper and lower plates, wherein the upper and lower plates are assembled to the front section of the rotary lever and the main body such that the front section of the rotary lever and at least a portion of the main body of the insulating housing are sandwiched between the upper and lower plates.

2. A card connector according to claim 1 wherein the main body has a stud provided thereon, the rotary lever has an aperture formed in a center of the lever, and the upper plate of the cover member has an aperture formed therein, wherein the apertures are larger than the stud and accommodate the stud therewithin to assemble the cover member, the main body and the rotary lever.

3. A card connector according to claim 1 further comprising a traversing shell cover that partially covers the card cavity, wherein the shell cover is coplanar with the rear section of the rotary lever and the cover member.

4. A card connector according to claim 1 wherein the card connector further comprise the cover member assembled to the main body and to the front section of the rotary lever wherein the cover member is coplanar with the rear section of the rotary lever.

5. A card connector according to claim 4 wherein the rotary lever has an arc-shaped projection formed on a lateral edge of the front section that abuts the rear plate of the cover member, thereby functioning as a pivot fulcrum for the rotary lever.

* * * * *